United States Patent Office 3,505,353
Patented Apr. 7, 1970

3,505,353
DIKETO-BENZODIPYRROLES
Charles L. Thomas, Swarthmore, Pa., assignor to Sun
Oil Company, Philadelphia, Pa., a corporation of New
Jersey
No Drawing. Filed Dec. 29, 1966, Ser. No. 605,574
Int. Cl. C07d 27/36
U.S. Cl. 260—326.11                 4 Claims

ABSTRACT OF THE DISCLOSURE

The compounds are

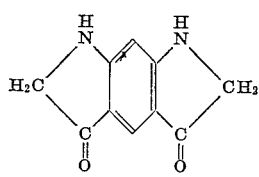

2,6-dihydro-3,5-diketobenzo (1,2-b:5,4-b') dipyrrole and

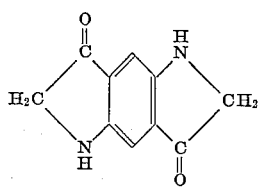

2,6-dihydro-3,7-diketobenzo (1,2-b:4,5-b') dipyrrole and the polymers prepared therefrom by oxidative polymerization of the individual monomers or mixtures of the two monomers. The monomers are useful as insecticides and biocides, and the polymers are useful as dyes and semiconductors.

SUMMARY OF THE INVENTION

The present invention relates to novel compounds. Particularly it relates to novel monomers having the structure

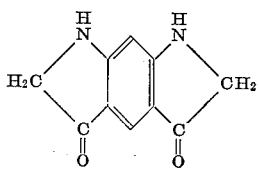

or

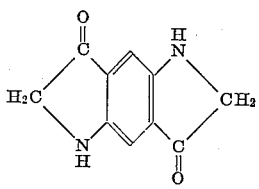

and the polymers produced therefrom.

DESCRIPTION OF THE INVENTION

The monomers of the present invention may be derived in a number of chemical syntheses, for example, as shown schematically below for pyromellitic dianhydride and meta-xylene as starting material.

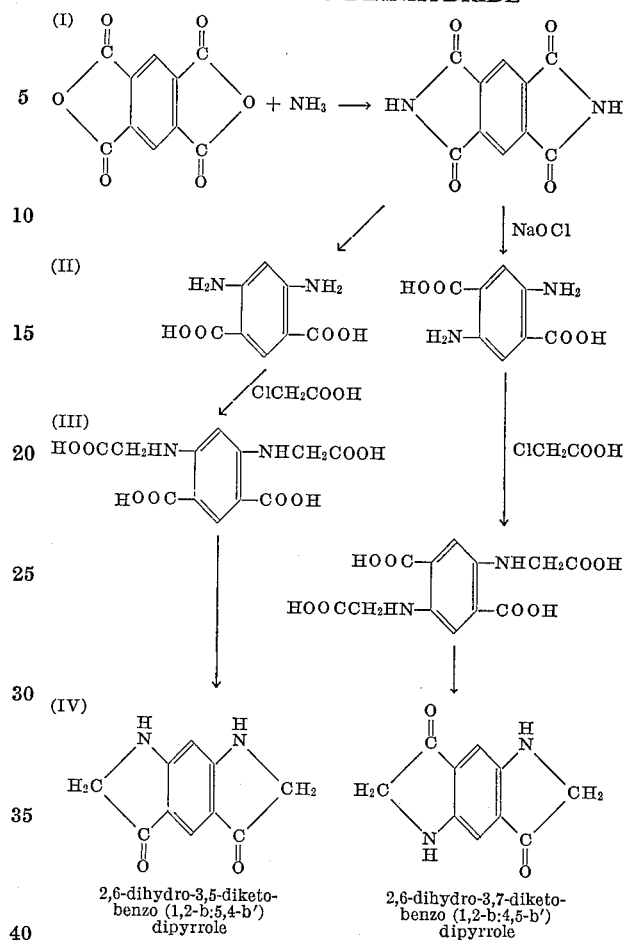

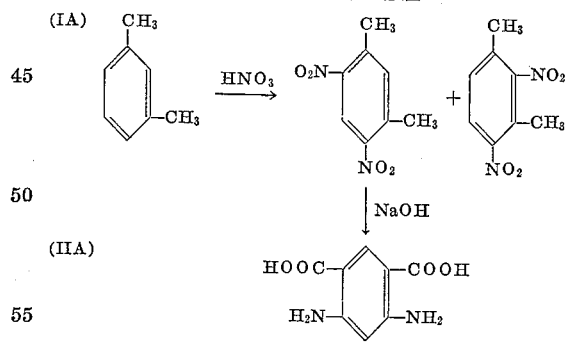

The product from Step IIA is then carried through Steps III and IV as shown above. The monomers of the invention are solid. The principal utility of the monomers is in the polymerization thereof. The monomers are also useful as insecticides and biocides.

The polymers of the present invention are useful as vat dyes and as organic semiconductors. Polymers suitable for use as vat dyes have a number average molecular weight in the range of 372 to 556, i.e., 2 to 3 repeating monomer units. The polymers generally suitable for use as semiconductors have a number average molecular weight in the range of 550 to 5500 wherein there are about 3 to 30 repeating units.

The polymers of the present invention comprise repeating units selected from the group consisting of

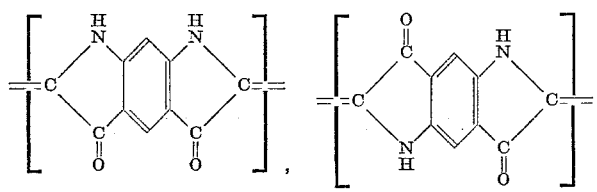

and mixtures thereof.

The polymers are prepared from a single pure monomer or a mixture of monomers by dissolving in alkaline hydrosulfite and oxidizing with oxygen or air. Alternatively, the monomer is oxidized by permanganate or dichromate. The molecular weight of the polymers is controlled by the degree of oxidation, i.e., the molecular weight increases with oxidation.

The vat dye polymers are easily used. The polymer is made soluble in water by treating with an aqueous solution of a reducing agent such as sodium hydrosulfite ($Na_2S_2O_4$) and alkali, i.e., NaOH or KOH. In this form the dye can be impregnated into a textile, paper, leather or the like and upon exposure to air will be reoxidized by atmospheric oxygen to the stable polymer form. The vat dyes are dark blue through black, the intensity depending on the extent of polymerization.

Once on the material to be dyed, the polymers exhibit unusual stability to light, heat, water and organic solvents.

The electrical properties of the high molecular weight polymers such as resistance, conductivity, dielectric constant and the like would indicate that they would be excellent semiconductors.

In order to more clearly illustrate the invention the following nonlimiting examples are submitted. Unless otherwise indicated, parts and percentages are by weight.

EXAMPLE I

Seventy-five grams of pyromellitic dianhydride and 120 g. solid ammonium carbonate are mixed, put in a round bottom flask which is placed in an oil bath, heated to 225° C. $H_2O$ and $CO_2$ are evolved. The reaction is completed when $H_2O$ is no longer evolved. The residue is crude pyromellitic diimide.

Forty-five grams of crude diimide and 60 g. NaOH are dissolved in 400 cc. of $H_2O$. The solution is cooled and 600 g. of cold 5% sodium hypochlorite solution added with stirring. The reaction is completed by warming to 80° C. for 30 minutes. The solution is cooled, neutralized with hydrochloric acid and then acidified with acetic to liberate the diamino-diacids, which are separated by filtration.

Two hundred grams of the diamino-diacids, 235 g. of sodium chloroacetate and 300 cc. of water are mixed and neutralized with NaOH. The mixture is heated under reflux for four hours. On cooling, hydrochloric acid is added to neutralize. Acetic acid is added to liberate the diacids which are then separated by filtration.

Fifteen parts of the diacids are added to a solution of 25 parts of NaOH in 10 parts of water. The mixture is heated while stirring (110° C. maximum) to dryness and the cake finely powdered. Fifteen parts of paraffin (melting point about 150° C.) and the powdered solid are heated in an iron pan with stirring to 250–270° C. Steam is evolved and the mass foams. When reaction ceases (260–280° C.) the mixture is cooled, boiled with water in the absence of air and the liquid filtered from the solid paraffin again in the absence of air. The monomers are liberated by acidifying the liquid and recovered by filtration as a yellowish crystalline material.

Where the compound is to be used as a dye, instead of liberating the monomers with acid, the aqueous solution can be oxidized with air whereupon the dye stuff separates as a finely divided sludge which is concentrated into a paste by centrifuging.

EXAMPLE II

A mixture of 2,4- and 2,6-dinitro-1,3-dimethylbenzene, which is prepared by the nitration of meta-xylene with $HNO_3$, is separated, e.g., by crystallizing from alcohol and the 4,6- recovered as crystals. 200 g. of 4,6-dinitro-1,3-dimethylbenzene plus 240 g. of NaOH are dissolved in alcohol and refluxed five hours. The solution is then saturated with $NH_3$ and $H_2S$ and refluxed three hours. The alcohol and excess ammonium sulfide are removed by heating. The solid is dissolved in water, filtered and neutralized with hydrochloric acid. The diamino-diacids are liberated by acetic acid and recovered by filtration. The process is continued as in Example I using the diamino-diacids.

EXAMPLE III

Five parts of the dyestuff paste prepared in Example I containing about 20% dyestuff are mixed with 3 parts of hot water. To this is added 17 parts of caustic soda solution (sp. gr. 1.38) and the mixture heated to 50° C. Twenty-five parts of sodium hydrosulfite solution (sp. gr. 1.1) are added and the temperature kept at 50° C. to reduce the dyestuff to the leuco form and disperse it in the solution.

The solution is diluted with 300 parts of warm water. Cotton fibers are thoroughly soaked therein. The fibers are wrung out and dried. During handling and drying in the air, the color develops.

As a polymer, the 20% dyestuff paste may be dried and the powder used directly as a molding powder, fabricating articles by heat and pressure.

The invention claimed is:
1. A composition of matter selected from the group consisting of 2,6-dihydro-3,7-diketo-benzo(1,2-b:4,5-b′) dipyrrole, 2,6 - dihydro-3,5-diketo-benzo(1,2-b:5,4-b′)dipyrrole and mixture thereof.
2. A composition of matter according to claim 1 wherein the compound is 2,6-dihydro-3,7-diketo-benzo (1,2-b:4,5-b′)dipyrrole.
3. A composition of matter according to claim 1 wherein the compound is 2,6-dihydro-3,5-diketo-benzo (1,2,b:5,4-b′)pyrrole.
4. A composition of matter according to claim 1 wherein the compound is a mixture of 2,6-dihydro-3,7-diketo-benzo(1,2-b:5,4-b′)dipyrrole and 2,6-dihydro-3,5-diketo-benzo(1,2-b:5,4-b′)dipyrrole.

References Cited

Ruggli et al., Chem. Abs., vol. 29–4762 (1935).

ALEX MAZEL, Primary Examiner

J. A. NARCAVAGE, Assistant Examiner

U.S. Cl. X.R.

8—34; 260—63, 999